United States Patent
Yamazaki

(10) Patent No.: US 9,506,521 B2
(45) Date of Patent: Nov. 29, 2016

(54) SHOCK ABSORBER SYSTEM

(71) Applicant: TOYOTA JIDOSHA KABUSHIKI KAISHA, Toyota-shi, Aichi-ken (JP)

(72) Inventor: Ippei Yamazaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/717,600

(22) Filed: May 20, 2015

(65) Prior Publication Data

US 2015/0354659 A1   Dec. 10, 2015

(30) Foreign Application Priority Data

Jun. 5, 2014   (JP) .................................. 2014-116373

(51) Int. Cl.
*F16F 9/512* (2006.01)
*B60G 17/016* (2006.01)
(Continued)

(52) U.S. Cl.
CPC .............. *F16F 9/512* (2013.01); *B60G 17/016* (2013.01); *B60G 17/018* (2013.01); *B60G 17/0182* (2013.01); *B60G 17/08* (2013.01); *F16F 9/464* (2013.01); *F16F 9/5126* (2013.01); *B60G 2400/102* (2013.01); *B60G 2400/202* (2013.01); *B60G 2400/206* (2013.01); *B60G 2500/10* (2013.01); *B60G 2500/104* (2013.01);
(Continued)

(58) Field of Classification Search
CPC ........ F16F 9/512; F16F 9/5126; F16F 9/464; B60G 17/016; B60G 17/18; B60G 17/08; B60G 2230/18; B60G 2400/202; B60G 2400/206; B60G 2500/104
See application file for complete search history.

(56) References Cited

U.S. PATENT DOCUMENTS 5,983,150 A   11/1999  Sasaki
6,092,011 A    7/2000  Hiramoto
(Continued)

FOREIGN PATENT DOCUMENTS

JP   H05-104927 A   4/1993
JP   H05-178044 A   7/1993
(Continued)

OTHER PUBLICATIONS

Jun. 8, 2016 Corrected Notice of Allowability issued in U.S. Appl. No. 14/703,310.
(Continued)

*Primary Examiner* — Thomas Irvin
(74) *Attorney, Agent, or Firm* — Oliff PLC

(57) ABSTRACT

A shock absorber system, including: a hydraulic shock absorber configured to generate a damping force with respect to a relative movement of a sprung portion and an unsprung portion; a damping-force changer configured to change the damping force; and a controller configured to determine a damping-force index and to control the damping-force changer, wherein the controller is configured to determine, as the index, a required application force to be applied to the sprung portion for damping its movement in an up-down direction, according to a determination rule in which the required application force has the same direction as a direction of a speed of the sprung portion in the up-down direction when the sprung speed is relatively small and acceleration of the sprung portion in the up-down direction is relatively large in a situation in which the direction of the speed and a direction of the acceleration are mutually different.

6 Claims, 8 Drawing Sheets

(51) Int. Cl.
*B60G 17/018* (2006.01)
*B60G 17/08* (2006.01)
*F16F 9/46* (2006.01)

(52) U.S. Cl.
CPC ....... *B60G2500/11* (2013.01); *B60G 2800/70* (2013.01); *F16F 2230/18* (2013.01)

(56) References Cited

U.S. PATENT DOCUMENTS

| | | | | |
|---|---|---|---|---|
| 6,314,353 | B1* | 11/2001 | Ohsaku | B60G 17/018 188/266.1 |
| 6,502,837 | B1 | 1/2003 | Hamilton et al. | |
| 6,701,235 | B2* | 3/2004 | Uchiyama | B60G 17/015 180/902 |
| 7,617,032 | B2* | 11/2009 | Izawa | B60G 11/14 188/267.2 |
| 8,398,091 | B2* | 3/2013 | Inoue | B60G 17/0157 188/266.1 |
| 8,668,060 | B2* | 3/2014 | Kondo | B60G 13/02 188/267 |
| 8,776,961 | B2* | 7/2014 | Mori | B60G 17/08 188/266.2 |
| 9,061,562 | B2* | 6/2015 | Hayakawa | B60G 17/01933 |
| 2005/0178628 | A1* | 8/2005 | Uchino | B60G 17/016 188/379 |
| 2008/0004770 | A1* | 1/2008 | Masamura | B60G 17/018 701/37 |
| 2008/0004771 | A1* | 1/2008 | Masamura | B60G 17/018 701/37 |
| 2010/0200343 | A1* | 8/2010 | Kondo | B60G 13/02 188/267 |
| 2012/0247888 | A1* | 10/2012 | Chikuma | B60G 17/08 188/266.1 |
| 2012/0305347 | A1 | 12/2012 | Mori et al. | |
| 2012/0305348 | A1* | 12/2012 | Katayama | B60G 17/08 188/266.2 |
| 2014/0005889 | A1* | 1/2014 | Hayakawa | B60G 17/01933 701/38 |
| 2014/0095024 | A1* | 4/2014 | Hirao | B60G 17/018 701/37 |
| 2014/0316652 | A1 | 10/2014 | Ericksen et al. | |
| 2015/0345587 | A1* | 12/2015 | Yamazaki | F16F 9/512 701/37 |

FOREIGN PATENT DOCUMENTS

| | | |
|---|---|---|
| JP | H05-208609 A | 8/1993 |
| JP | H09-123726 A | 5/1997 |
| JP | 2007-168716 A | 7/2007 |
| JP | 2011-007322 A | 1/2011 |

OTHER PUBLICATIONS

U.S. Appl. No. 14/703,310, filed May 4, 2015 in the name of Yamazaki.

May 25, 2016 Notice of Allowance issued in U.S. Appl. No. 14/703,310.

* cited by examiner

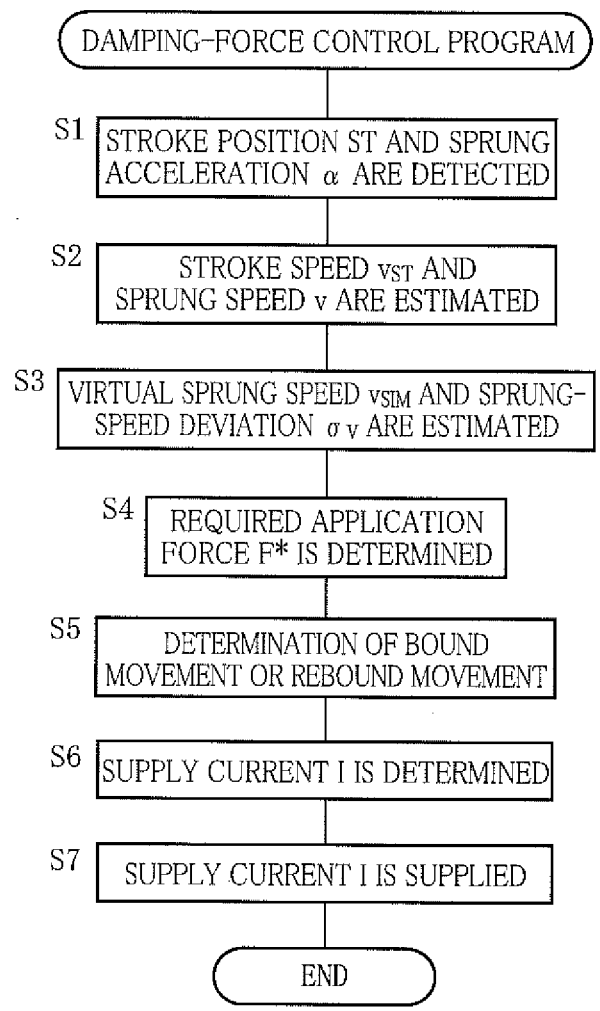

SHOCK ABSORBER SYSTEM

CROSS REFERENCE TO RELATED APPLICATION

The present application claims priority from Japanese Patent Application No. 2014-116373, which was filed on Jun. 5, 2014, the disclosure of which is herein incorporated by reference in its entirety.

BACKGROUND OF THE INVENTION

Field of the Invention

The present invention relates to a shock absorber system for vehicles in which a damping force to be generated by a hydraulic shock absorber is changeable.

Description of the Related Art

For damping a vibration of a sprung portion in a control of a hydraulic shock absorber, there is known a technique in which a damping force of the hydraulic shock absorber is changed based on a sprung speed that is a speed of the sprung portion, as described in the following Patent Literature, for instance.

Patent Literature 1: JP-A-5-208609

SUMMARY OF THE INVENTION

In the above technique, the damping force is changed based on the sprung speed, so that the vibration of the sprung portion (sprung vibration) can be effectively reduced or prevented. However, there remains plenty of room for improvement in the technique of preventing or reducing the sprung vibration by the hydraulic shock absorber. It is therefore an object of the present invention to provide a shock absorber system capable of effectively damping the vibration of the sprung portion.

To achieve the object indicated above, the present invention provides a shock absorber system in which a damping force to be generated by a hydraulic shock absorber is changeable. In the shock absorbers system according to the present invention, there is employed, as an index for changing the damping force, a required application force that is a force to be applied to the sprung portion for damping a movement of the sprung portion in an up-down direction, and the required application force is determined according to a determination rule in which the required application force has the same direction as a direction of a sprung speed when the sprung speed is relatively small and sprung acceleration is relatively large in a situation in which the direction of the sprung speed and a direction of the sprung acceleration are mutually different.

According to the shock absorber system constructed as described above, the damping force to be generated by the hydraulic shock absorber is changed based on the required application force, as the damping-force index, that depends on not only the sprung speed but also the sprung acceleration that is acceleration of the sprung portion. It is thus possible to effectively damp the vibration of the sprung portion.

Forms of the Invention

There will be exemplified and explained various forms of an invention that is considered claimable. (The invention will be hereinafter referred to as "claimable invention" where appropriate). Each of the forms is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following description of various forms and an embodiment. It is to be further understood that, as long as the claimable invention is construed in this way, any form in which one or more constituent elements is/are added to or deleted from any one of the following forms may be considered as one form of the claimable invention.

An exemplary aspect of the invention will now be described.

(1) A shock absorber system, comprising:

a hydraulic shock absorber disposed between a sprung portion and an unsprung portion of a vehicle, the hydraulic shock absorber being configured to extend and contract in accordance with a relative movement of the sprung portion and the unsprung portion in an up-down direction and to generate a damping force with respect to the relative movement;

a damping-force changer configured to give a resistance to a flow of a working fluid caused in the hydraulic shock absorber by the relative movement of the sprung portion and the unsprung portion and to change a magnitude of the resistance, so as to change the damping force to be generated by the hydraulic shock absorber; and a controller configured to determine a damping-force index that is an index for changing the damping force and to control the damping-force changer based on the determined damping-force index, so as to control the damping force to be generated by the hydraulic shock absorber, wherein the controller is configured to determine, as the damping-force index, a required application force that is a force to be applied to the sprung portion for damping a movement of the sprung portion in the up-down direction, according to a determination rule in which the required application force has the same direction as a direction of a sprung speed that is a speed of the sprung portion in the up-down direction when the sprung speed is relatively small and sprung acceleration that is acceleration of the sprung portion in the up-down direction is relatively large in a situation in which the direction of the sprung speed and a direction of the sprung acceleration are mutually different.

It is common to damp a vibration of the sprung portion based on the so-called skyhook damper theory. According to the skyhook damper theory, a damping force mainly based on a speed of the sprung portion (hereinafter referred to as "sprung speed" where appropriate) is applied to the sprung portion. In the shock absorber system according to this form, there is executed a control not based on the skyhook damper theory, but based on a theory that the vibration of the sprung portion is damped based on both of the sprung speed and acceleration of the sprung portion (hereinafter referred to as "sprung acceleration" where appropriate). In short, the theory is characterized in that, when the sprung speed is relatively small (low) and the sprung acceleration is relatively large (high) in a situation in which the direction of the sprung speed and the direction of the sprung acceleration are opposite to each other, the force that acts on the sprung portion has a direction to propel the movement of the sprung portion. On the basis of the theory, the hydraulic shock absorber (hereinafter simply referred to as "absorber" where appropriate), specifically, a damping-force generating characteristic of the absorber (which is a concept including "damping coefficient" and the like), is controlled. According to such a control, it is possible to more effectively damp the vibration of the sprung portion. In this form, each of the sprung speed and the sprung acceleration is a concept that does not include a direction. Therefore, "the sprung speed is large or small" or "the sprung acceleration is large or small" means that an absolute value of the sprung speed or the sprung acceleration is large or small, in a strict sense.

Actually, the hydraulic shock absorber can only generate the damping force with respect to the relative movement of the sprung portion and the unsprung portion. Where a direction of the required application force that is a force to be applied to the sprung portion based on the above theory differs from a direction of the damping force that can be actually generated by the absorber, the absorber can be controlled based on the above theory to a possible extent by minimizing the damping coefficient of the shock absorber. (In this respect, "minimizing the damping coefficient" includes a state in which the damping force is not substantially generated). That is, this form is not limited to a form that achieves a state in which a force having the same direction as the direction of the required application force constantly acts on the sprung portion, but may include a form that achieves a state in which a force whose direction is opposite to the direction of the required application force acts on the sprung portion under a specific condition due to the structure of the absorber. The same goes for the following forms.

(2) The shock absorber system according to the form (1), wherein the controller is configured to control the damping force to be generated by the hydraulic shock absorber such that the damping force increases with an increase in the required application force.

According to this form, the vibration of the sprung portion can be reduced or prevented based on the above theory with higher reliability. In this form, each of the required application force and the damping force generated by the absorber does not depend on a direction. This form may include a form in which the damping coefficient of the absorber is increased with an increase in the required application force, for instance.

(3) The shock absorber system according to the form (1) or (2), wherein, where there is set a boundary line, in a coordinate system whose transverse axis represents the sprung speed and vertical axis represents the sprung acceleration, which passes an origin at which both of the sprung speed and the sprung acceleration are 0 and which extends across a second quadrant and a fourth quadrant, the controller determines the required application force according to the determination rule in which the required application force has the same direction as the direction of the sprung speed when the sprung speed and the sprung acceleration belong to a region in the second quadrant that is located on one of opposite sides of the boundary line nearer to a first quadrant or a region in the fourth quadrant that is located on one of opposite sides of the boundary line nearer to a third quadrant.

(4) The shock absorber system according to the form (3), wherein the controller is configured to determine the required application force according to the determination rule in which the boundary line is set as a curved line which is convex toward the first quadrant in the second quadrant and which is convex toward the third quadrant in the fourth quadrant.

(5) The shock absorber system according to the form (3) or (4), wherein the controller is configured to determine the required application force according to the determination rule in which the boundary line is set as a function indicative of a virtual sprung speed that is virtually estimated based on the sprung acceleration.

In the above three forms, the determination rule is defined so as to be visually easily understandable. Each of the above-indicated regions will be referred to as "identical region" in which the direction of the sprung speed and the direction of the required application force are identical to each other. In the identical region, the direction of the required application force and the direction of the sprung speed coincide with each other. In an extreme sense, the movement of the sprung portion is propelled by the required application force in the identical region.

(6) The shock absorber system according to any one of the forms (1)-(5), wherein the controller is configured to determine the required application force according to the determination rule in which a direction in which the required application force acts changes depending upon whether a deviation of the sprung speed from a virtual sprung speed that is virtually estimated based on the sprung acceleration is positive or negative.

(7) The shock absorber system according to the form (6), wherein the controller is configured to determine the required application force according to the determination rule in which the required application force increases with an increase in the deviation.

In the above two forms, the determination rule is defined according to an arithmetic rule. Where the virtual sprung speed in the above two forms and the virtual sprung speed in the form that precedes the above two forms are the same, these forms are described from different viewpoints.

(11) The shock absorber system according to any one of the forms (1)-(7), wherein the damping-force changer has a valve mechanism configured to give a resistance to the flow of the working fluid and a solenoid configured to apply, to the valve mechanism, a force that depends on an electromagnetic force so as to change a valve opening pressure of the valve mechanism, the damping-force changer being configured to change the damping force in accordance with an electric current to be supplied to the solenoid.

In this form, the structure of the damping-force changer is limited. There may be employed a damping-force changer configured to change the damping force to be generated by changing a cross-sectional area of a fluid passage through which the working fluid flows, i.e., a cross-sectional area of an orifice, for instance. Unlike the damping-force changer having such a structure, the damping-force changer of this form includes the so-called poppet valves. In other words, the damping-force changer of this form includes a valve configured to be opened by a difference in the pressure of the working fluid between the front side and the rear side of the valve, and the valve opening pressure is changed by changing the electric current supplied to the solenoid, whereby the damping force to be generated is changed. The thus constructed damping-force changer has a good response of the change in the damping force with respect to the change in the supply current, so that it is possible to effectively damp the vibration of the sprung portion.

(12) The shock absorber system according to the form (11),
wherein the damping-force changer has (a) a main fluid passage through which the working fluid flows, (b) a main valve provided in the main fluid passage as the valve mechanism, (c) a bypass fluid passage provided so as to bypass the main valve, (d) a pilot chamber provided in the bypass fluid passage and configured to apply, to the main valve, an internal pressure that acts in a direction to close the main valve, and (e) a pilot valve configured to change the internal pressure of the pilot chamber in accordance with the electric current to be supplied to the solenoid, and wherein the damping-force changer is configured to change a valve opening pressure of the main valve by a change in the internal pressure of the pilot chamber by the pilot valve.

In this form, the structure of the damping-force changer is further limited. This form achieves, in a relatively simple structure, the hydraulic shock absorber having a characteristic that a gradient according to which the damping force changes relative to a change in a stroke speed when the stroke speed is low is made different from a gradient according to which the damping force changes relative to a change in the stroke speed when the stroke speed is high. In this respect, the stroke speed is a relative speed of the sprung portion and the unsprung portion in the up-down direction, i.e., sprung-unsprung relative speed.

BRIEF DESCRIPTION OF THE DRAWINGS

The objects, features, advantages, and technical and industrial significance of the present invention will be better understood by reading the following detailed description of an embodiment of the invention, when considered in connection with the accompanying drawings, in which:

FIG. 8 is a flow chart showing a damping-force control program executed in the shock absorber system according to the embodiment.

DETAILED DESCRIPTION OF THE EMBODIMENT

Figure 1:
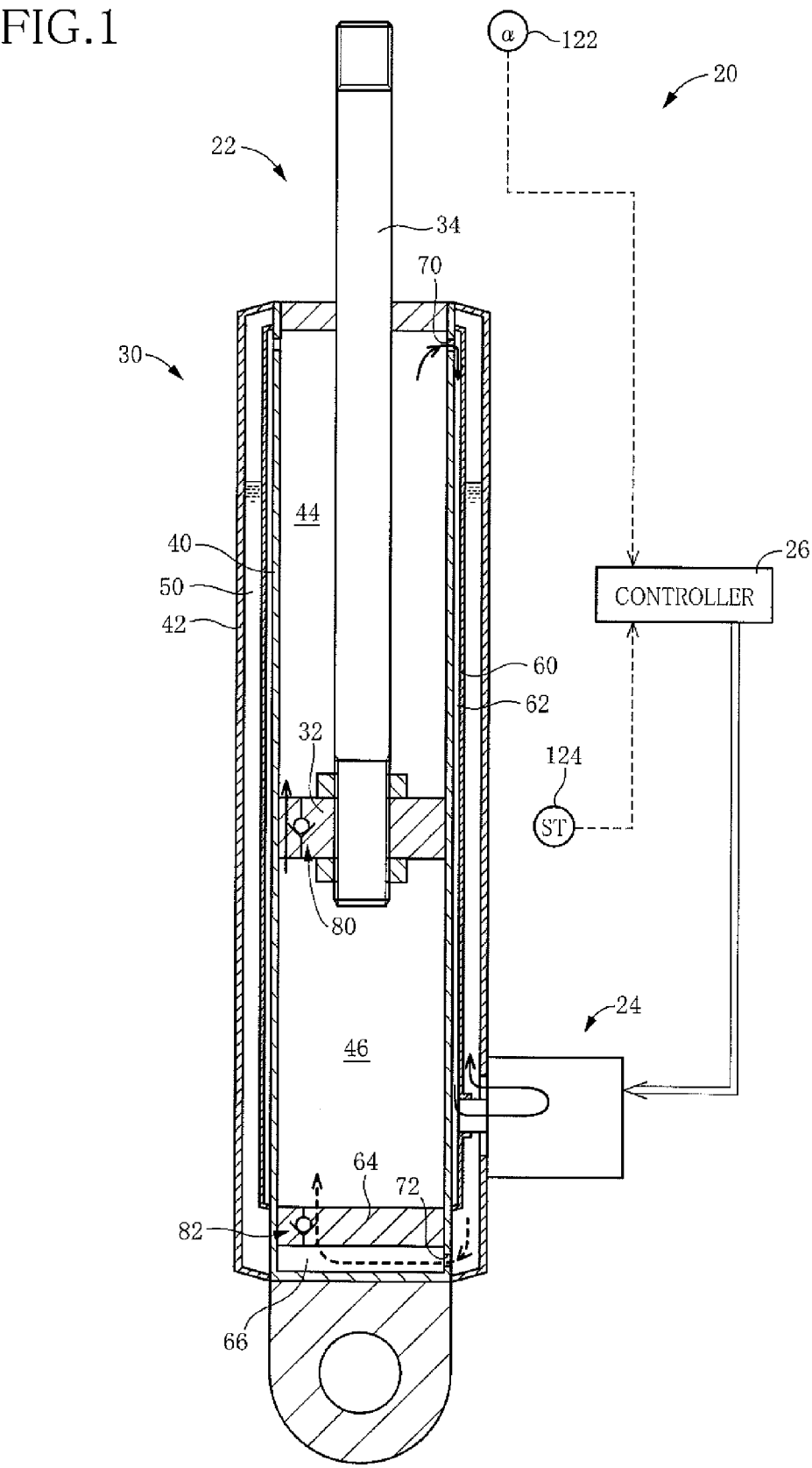
FIG. 1 is a view showing an overall structure of a shock absorber system according to one embodiment.

Referring to the drawings, there will be explained below in detail a shock absorber system according to one embodiment of the claimable invention. It is to be understood that the claimable invention is not limited to the details of the following embodiment, but may be embodied with other changes and modifications based on the knowledge of those skilled in the art.

Embodiment

1. Overall Structure of Shock Absorber System

As shown in FIG. 1, a shock absorber system 20 (hereinafter simply referred to as "absorber system 20" where appropriate) according to one embodiment has a hydraulic shock absorber 22 of cylinder type (hereinafter simply referred to as "absorber 22" where appropriate), a damping-force changer 24 configured to generate a damping force with respect to a movement of the absorber 22 and to change the magnitude of the damping force, and a controller 26 as a control device for controlling the damping-force changer 24. An ordinary four-wheel vehicle has four absorbers 22 respectively provided for a front right wheel, a front left wheel, a rear right wheel, and a rear left wheel. Each absorber 22 connects a corresponding unsprung portion and a corresponding sprung portion of the vehicle. Four damping-force changers 24 provided for the respective four absorbers 22 are controlled by one controller 26 that functions as a common controller.

The absorber 22 has a housing 30, a piston 32 disposed in the housing 30 so as to be movable in the up-down direction, and a rod 34 having one end portion (lower end portion) connected to the piston 32 and another end portion (upper end portion) extending upward from the housing 30. The housing 30 is connected at its lower end portion to a lower arm as the unsprung portion, and the upper end portion of the rod 34 is connected to a mount portion of a body of a vehicle as the sprung portion. That is, the absorber 22 extends and contracts when the sprung portion and the unsprung portion move relative to each other in the up-down direction. Specifically, the absorber 22 extends when the sprung portion and the unsprung portion move relative to each other in a direction away from each other (hereinafter referred to as "in the rebound movement" or "when the sprung portion and the unsprung portion rebound" where appropriate). The absorber 22 contracts when the sprung portion and the unsprung portion move relative to each other in a direction toward each other (hereinafter referred to as "in the bound movement" or "when the sprung portion and the unsprung portion bound" where appropriate).

The housing 30 has a generally twin-tube structure and includes a main tube 40 having a closed end and an outer tube 42 disposed radially outwardly of the main tube 40. The piston 32 is slidably disposed in the main tube 40. The piston 32 partitions an interior of the main tube 40 into two fluid chambers, i.e., a rod-side chamber 44 through which the rod 34 extends and an opposite chamber 46 through which the rod 34 does not extend. Further, a buffer chamber (which may be referred to as "reservoir") 50 is defined between the main tube 40 and the outer tube 42. The buffer chamber 50 stores a working fluid.

An intermediate tube 60 is disposed in the housing 30 between the main tube 40 and the outer tube 42. An annular fluid passage 62 is defined between an inner circumferential surface of the intermediate tube 60 and an outer circumferential surface of the main tube 40. There is disposed, at an inner bottom portion of the main tube 40, a partition member 64 that defines the bottom of the opposite chamber 46. A bottom fluid passage 66 is formed between the partition member 64 and the bottom wall of the main tube 40.

A communication hole 70 is provided at an upper portion of the main tube 40 for fluid communication between the fluid passage 62 and the rod-side chamber 44. A bottom communication hole 72 is provided at a portion of the main tube 40 near to its lower end for fluid communication between the buffer chamber 50 and the bottom fluid passage 66.

As explained later in detail, the damping-force changer 24 permits passage, therethrough, of the working fluid that flows out of the rod-side chamber 44 and subsequently flows into the buffer chamber 50 via the fluid passage 62 and has a function to give a resistance to the flow of the working fluid.

In the bound movement, the working fluid initially flows into the rod-side chamber 44 from the opposite chamber 46 via a check valve 80 provided in the piston 32, as indicated by the solid line arrow in FIG. 1. Because the amount of the working fluid that flows into the rod-side chamber 44 is larger than the volume of the rod-side chamber 44 that is increased as a result of the movement of the piston 32, the working fluid initially flows out of the rod-side chamber 44 via the communication hole 70 and the fluid passage 62, then passes through the damping-force changer 24, and finally flows into the buffer chamber 50. In this instance, the absorber 22 generates a damping force with respect to contraction thereof, namely, a damping force with respect to the bound movement, by the resistance given to the flow of the working fluid that passes through the damping-force changer 24.

On the other hand, in the rebound movement, the working fluid initially flows out of the rod-side chamber 44 via the communication hole 70 and the fluid passage 62, then passes through the damping-force changer 24, and finally flows into the buffer chamber 50, as in the bound movement. In this instance, the absorber 22 generates a damping force with respect to extension thereof, namely, a damping force with respect to the rebound movement, by the resistance given to the flow of the working fluid that passes through the damping-force changer 24. In this instance, the working fluid flows into the opposite chamber 46 from the buffer chamber 50 via the bottom communication hole 72, the bottom fluid passage 66, and a check valve 82 provided in the partition member 64, as indicated by the dashed line arrow in FIG. 1.

2. Structure of Damping-Force Changer

There will be hereinafter explained a structure of the damping-force changer 24. Because there are known damping-force changers having a structure similar to that of the damping-force changer 24 (such as the one disclosed in JP-A-2011-132995), the structure of the damping-force changer 24 will be explained briefly.

Figure 2:
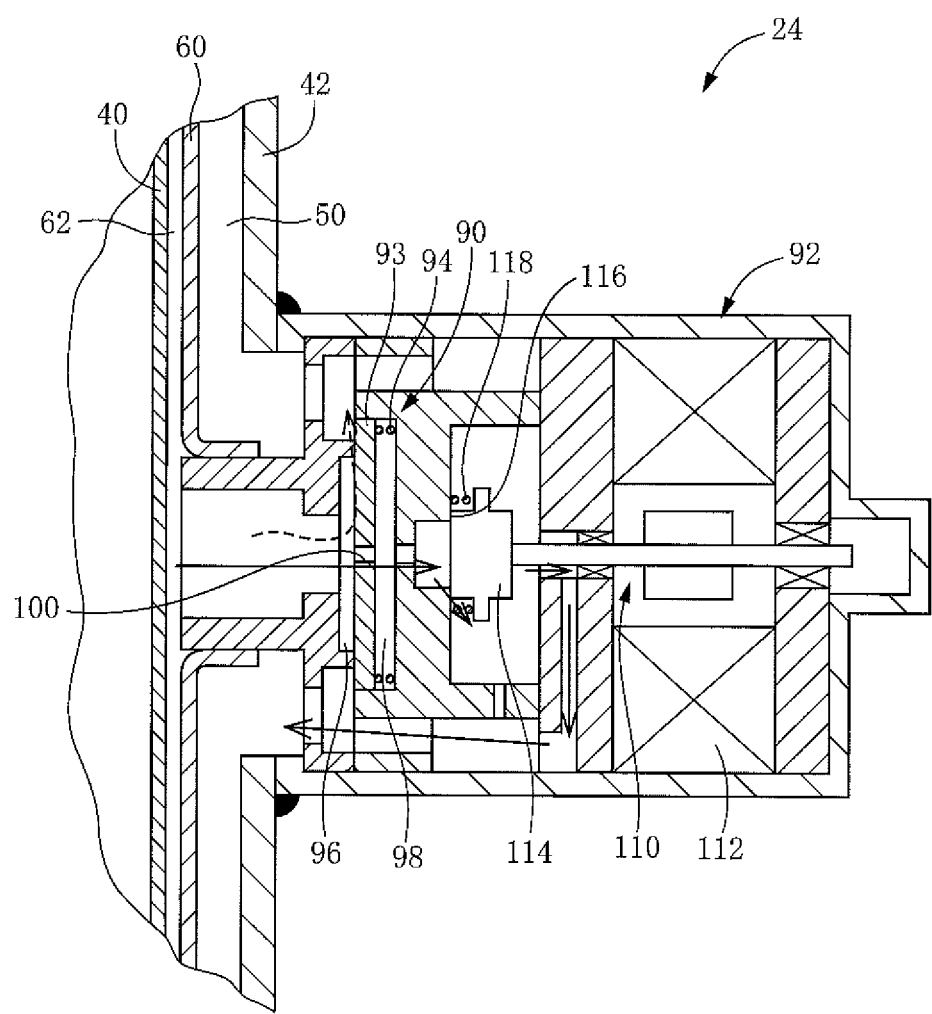
FIG. 2 is a cross-sectional view showing a structure of a damping-force changer of the shock absorber system according to the embodiment.

As shown in FIG. 2, the damping-force changer 24 has a main valve 90 as a valve mechanism for giving the resistance to the working fluid passing therethrough and a solenoid valve 92 for adjusting a valve opening pressure of the main valve 90. In this respect, each of the two valves 90, 92 is the so-called poppet valve.

A valve plate 93 of the main valve 90 is biased by a compression coil spring 94 functioning as a biasing (urging) member in a direction in which the valve plate 93 is seated. A force that acts on the valve plate 93 due to a difference between a fluid pressure in a high-pressure chamber 96 located on a front side of the valve plate 93 (i.e., on a left side of the valve plate 93 in FIG. 2) and a fluid pressure in a low-pressure chamber 98 located on a rear side of the valve plate 93 (i.e., on a right side of the valve plate 93 in FIG. 2) opens the main valve 90 against a biasing force of the spring 94. (The force may be referred to as "pressure-difference acting force" where appropriate.) That is, as indicated by the dashed line arrow in FIG. 2, there is caused a flow of the working fluid from the fluid passage 62 to the buffer chamber 50, and the main valve 90 gives the resistance to the flow of the working fluid. In other words, the main valve 90 gives the resistance to the flow of the working fluid passing through a main fluid passage indicated by the broken line arrow.

The main valve 90 is provided with an orifice 100 for giving a resistance to a flow of the working fluid from the high-pressure chamber 96 to the low-pressure chamber 98. The working fluid that has passed through the orifice 100 flows into the buffer chamber 50, as indicated by the solid line arrow in FIG. 2. That is, the fluid passage indicated by the solid line arrow is a bypass fluid passage that bypasses the main valve 90, and the working fluid flows also into the buffer chamber 50 through the bypass fluid passage.

The solenoid valve 92 has a movable member 110 and a coil 112 configured to generate, by energization, an electromagnetic force for moving the movable member 110. A valve head 114 is provided at a distal end of the movable member 110. The valve head 114 is configured to be seated on and separated away from a valve seat 116, thereby opening and closing the low-pressure chamber 98. The movable member 110 is biased by a compression coil spring 118 in a direction in which the valve head 114 is separated away from the valve seat 116. While it may be difficult to understand because of omission of illustration of the structure, there acts, on the movable member 110, a biasing force in a direction in which the valve head 114 is seated on the valve seat 116 by energization of the coil 112. That is, the movable member 110 and the coil 112 constitute a solenoid for seating the valve head 114 on the valve seat 116.

The thus constructed solenoid valve 92 can adjust an opening degree of the low-pressure chamber 98, namely, an outflow amount of the working fluid from the low-pressure chamber 98 into the buffer chamber 50. That is, the solenoid valve 92 can adjust a fluid pressure in the low-pressure chamber 98 and thereby adjust the valve opening pressure of the main valve 90. In this respect, the valve opening pressure of the main valve 90 depends on an amount of an electric current supplied to the coil 112. With an increase in the electric current, the opening degree of the solenoid valve 92 with respect to the low-pressure chamber 98 becomes low, the fluid pressure in the low-pressure chamber 98 becomes high, and the valve opening pressure of the main valve 90 becomes high. That is, with an increase in the electric current, the resistance to the flow of the working fluid that flows into the buffer chamber 50 via the main valve 90 becomes large.

Concerning the structure of the damping-force changer 24, the main valve 90 is a valve disposed in the main fluid passage, the low-pressure chamber 98 functions as a pilot chamber provided in the bypass fluid passage and configured to apply an internal pressure to the main valve 90 in a direction to close the main valve 90, and the solenoid valve 92 functions as a pilot valve configured to change the internal pressure of the pilot chamber.

In the thus constructed damping-force changer 24, when a speed $v_{ST}$ of a relative movement of the sprung portion and the unsprung portion (hereinafter, referred to as "stroke speed $v_{ST}$" where appropriate) is low, the main valve 90 is not opened, and a damping force F generated by the absorber 22 generally depends on the resistance to the flow of the working fluid that passes through the orifice 100 formed in the main valve 90. When the difference between the fluid pressure in the high-pressure chamber 96 and the fluid pressure in the low-pressure chamber 98 becomes large and the main valve 90 is accordingly opened, the damping force F generally depends on the resistance to the flow of the working fluid that passes through the main valve 90. As described above, the valve opening pressure of the main valve 90 becomes high and the damping force F generally becomes high with an increase in the electric current supplied to the coil 112.

3. Characteristic of Damping Force Generated by Hydraulic Shock Absorber

Figure 3:
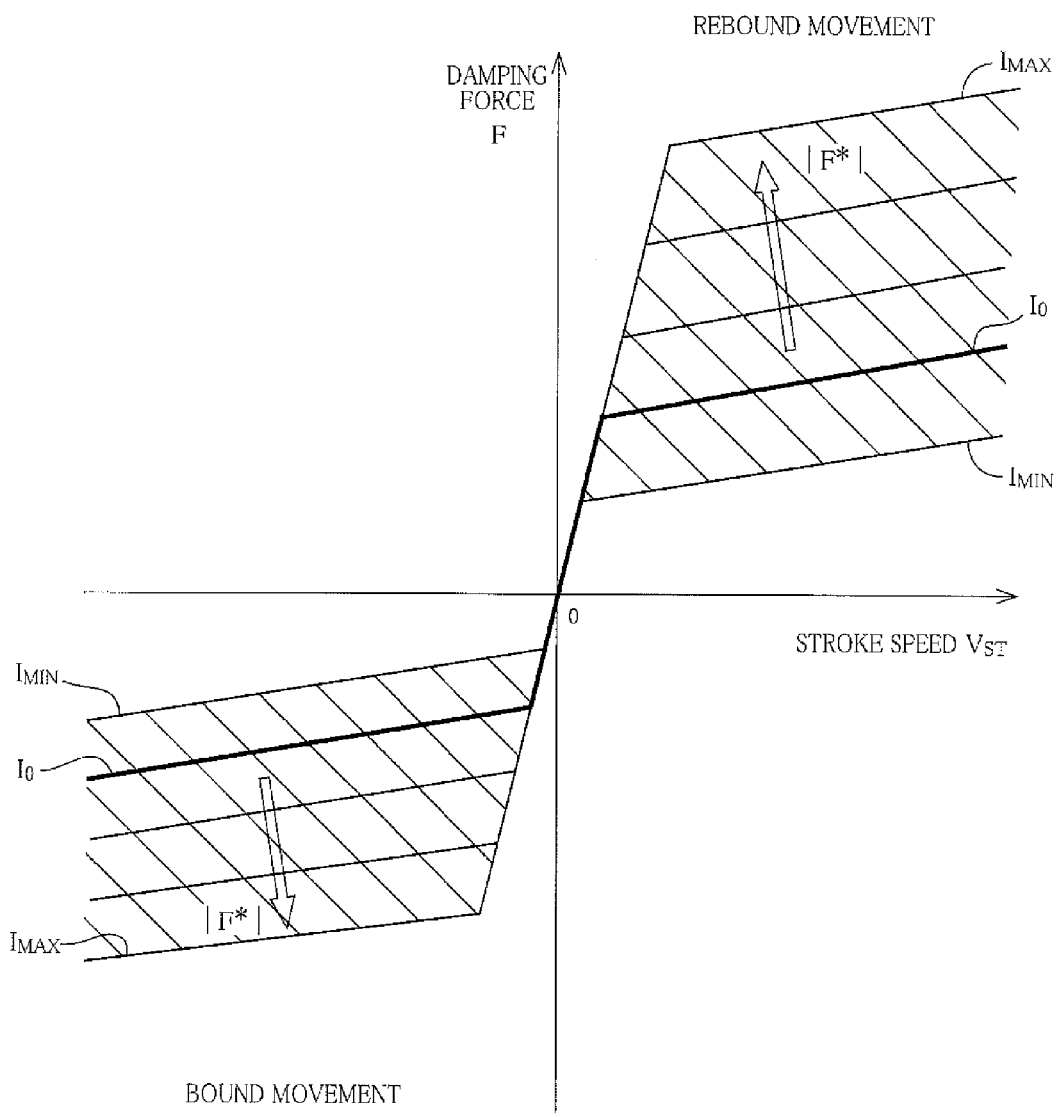
FIG. 3 is a graph showing a damping-force characteristic of the shock absorber system according to the embodiment.

As explained above, the absorber system 20 is configured such that the working fluid flows into the buffer chamber 50 through the damping-force changer 24 both of when the absorber 22 extends and when the absorber 22 contracts and such that the damping-force changer 24 gives the resistance to the flow of the working fluid, whereby the absorber 22 generates the damping force with respect to both of extension and contraction thereof. The characteristic of the damping force, namely, the magnitude of the damping force with respect to an extension speed and a contraction speed of the absorber 22, is illustrated by the graph of FIG. 3. It is noted that the extension speed and the contraction speed of the absorber 22 may be regarded so as to be equal to the stroke speed $v_{ST}$, namely, a relative speed of the sprung portion and the unsprung portion in the up-down direction. In view of this, the damping-force characteristic is illustrated as a graph (FIG. 3) representing the magnitude of the damping force F with respect to the stroke speed $v_{ST}$.

In the graph of FIG. 3, a positive value of the stroke speed $v_{ST}$ represents a speed when the absorber 22 extends, i.e., a speed in the rebound movement while a negative value of the stroke speed $v_{ST}$ represents a speed when the absorber 22 contracts, i.e., a speed in the bound movement. Further, a positive value of the damping force F represents a force in a direction against extension, i.e., a force in a bound direction while a negative value of the damping force F represents a force in a direction against contraction, i.e., a force in a rebound direction. The first quadrant in the graph of FIG. 3 represents a damping-force characteristic with respect to the rebound movement, and the third quadrant in the graph of FIG. 3 represents a damping-force characteristic with respect to the bound movement. Further, the graph of FIG. 3 shows the damping-force characteristics in different values of electric current supplied to the coil 112 of the damping-force changer 24. In the following explanation, the following concepts "the stroke speed $v_{ST}$ is high", "the stroke speed $v_{ST}$ is low", "the damping force F is large", and "the damping force F is small" are concepts that do not depend on a direction of the stroke speed $v_{ST}$ and a direction of the damping force F unless otherwise specified. In other words, the above concepts are based on absolute values of the stroke speed $v_{ST}$ and absolute values of the damping force F.

The damping-force characteristic indicated by the bold solid line in the graph of FIG. 3 is the damping-force characteristic when a normal current $I_0$ is supplied to the coil 112. The characteristic will be explained in relation to the structure of the damping-force changer 24. When the stroke speed $v_{ST}$ is low, the main valve 90 is not opened, and the damping force F depends on the resistance to the flow of the working fluid passing through the orifice 100 of the main valve 90. When the stroke speed $v_{ST}$ becomes high, the pressure difference between the high-pressure chamber 96 and the low-pressure chamber 98 becomes large and the main valve 90 is accordingly opened. Consequently, the damping force F depends on the resistance to the flow of the working fluid passing through the main valve 90. In each characteristic line in FIG. 3, a point at which the gradient changes is a point at which the main valve 90 starts to be opened. As apparent from the shape of each characteristic line, the characteristic is established such that the gradient according to which the damping force F changes relative to a change in the stroke speed $v_{ST}$ when the stroke speed $v_{ST}$ is low and the gradient according to which the damping force F changes relative to a change in the stroke speed $v_{ST}$ when the stroke speed $v_{ST}$ is high are mutually different in association with the opening of the main valve 90.

As explained above, the valve opening pressure of the main valve 90 becomes high with an increase in an electric current I supplied to the coil 112. In the absorber system 20, the damping-force changer 24 is configured such that the magnitude of the damping force F to be generated is changeable within a hatched range in the graph of FIG. 3. Specifically, the current I to be supplied to the coil 112 is changeable within a range defined by a maximum current $I_{MAX}$ and a minimum current $I_{MIN}$ with the normal current $I_0$ interposed therebetween, and the characteristic of the damping force F to be generated is changeable within the range. The amount of flow of the working fluid passing through the damping-force changer 24 (the speed of the flow of the working fluid passing through the damping-force changer 24) in the rebound movement and the amount of flow of the working fluid (the speed of the flow of the working fluid) in the bound movement are different even at the same stroke speed $v_{ST}$. In view of this, the normal current $I_0$, the maximum current $I_{MAX}$, and the Minimum current $I_{MIN}$ are set individually for the rebound movement and for the bound movement.

In terms of the function of the damping-force changer 24 described above, the damping-force changer 24 functions as a damping-force characteristic changer for changing the characteristic of the damping force generated by the absorber 22. In other words, the damping-force changer 24 may be regarded as having a function of changing a damping coefficient of the absorber 22. The damping-force changer 24 is configured to change the damping force not by changing a cross-sectional area of the orifice, but by adjusting the valve opening pressure, thereby enabling execution of the damping-force control with high controllability and high response.

4. Control of Damping Force Generated by Hydraulic Shock Absorber

In the absorber system 20, the control of the damping force generated by the absorber 22, namely, the control of the current I supplied to the coil 112 of the damping-force changer 24 (hereinafter simply referred to as "current I supplied to the damping-force changer 24"), is executed based on a damping-force index. For effectively damping a vibration of the sprung portion, the absorber system 20 employs, as the damping-force index, a force F* to be applied to the sprung portion for effectively damping the movement of the sprung portion in the up-down direction. The force F* will be hereinafter referred to as "required application force F*" where appropriate. Hereinafter, there will be explained in order a concept of the required application force F*, the control of the damping force based on the required application force F*, and a process of the control.

(a) Concept of Required Application Force

In a control for damping the vibration of the sprung portion based on the ordinary skyhook damper theory, only a speed v of the sprung portion in the up-down direction (hereinafter referred to as "sprung speed v" where appropriate) is employed as the damping-force index, and the damping force is controlled based on the sprung speed v such that a force in a direction opposite to a direction of the sprung speed v is applied to the sprung portion as the required application force F*. In contrast, in the absorber system 20, the required application force F* is determined based on acceleration $\alpha$ of the sprung portion in the up-down direction (hereinafter referred to as "sprung acceleration α" where appropriate), in addition to the sprung speed v.

Figure 4:
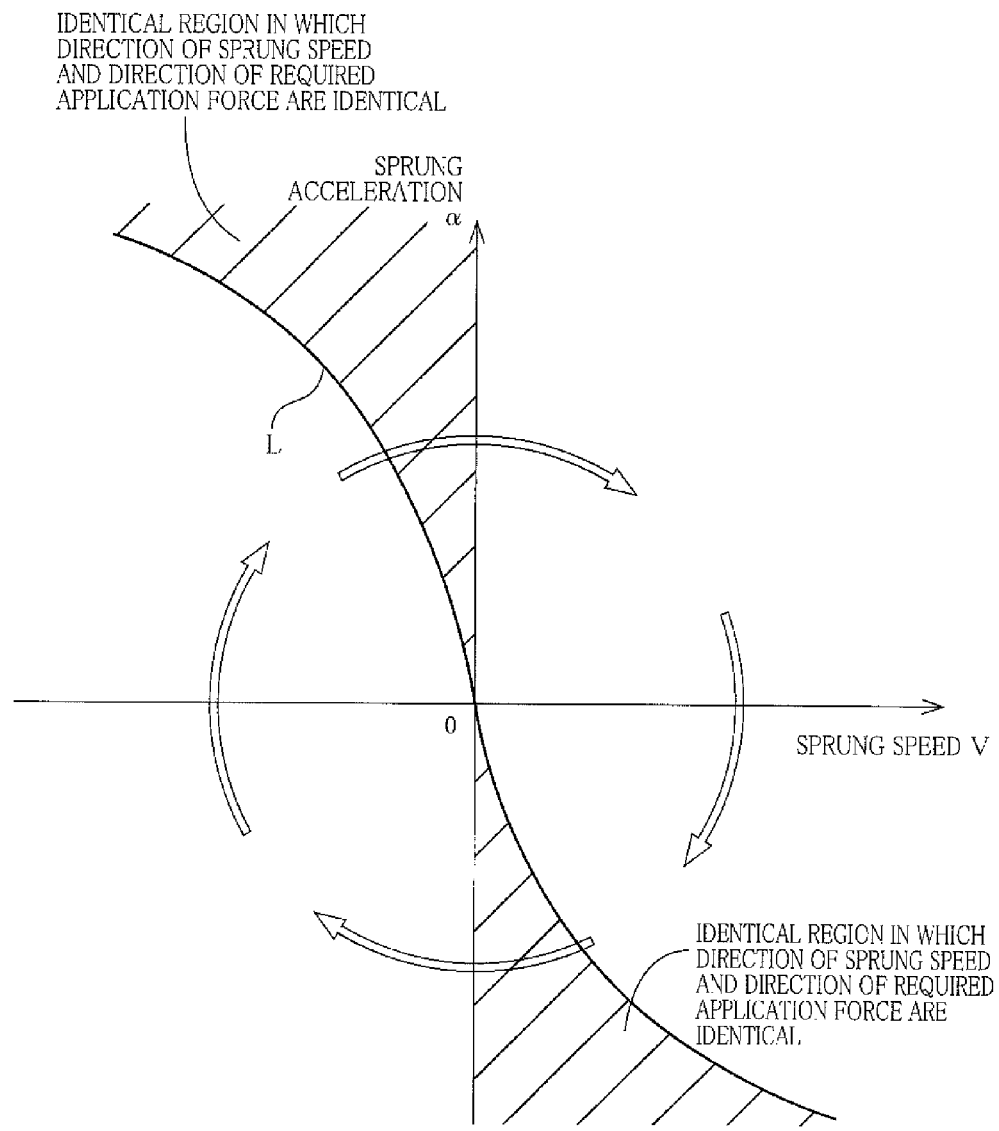
FIG. 4 is a graph for explaining regions of a sprung speed and sprung acceleration in relation to a determination rule for determining a required application force.

FIG. 4 is a graph in a coordinate system in which a transverse axis represents the sprung speed v and the vertical axis represents the sprung acceleration α. The graph shows a boundary line in the coordinate system, specifically, a boundary line L on which the direction of the required application force F* changes. A positive value of the sprung speed v and a positive value of sprung acceleration α represent an upward speed and upward acceleration, respectively, while a negative value of the sprung speed v and a negative value of the sprung acceleration α represent a downward speed and downward acceleration, respectively. In the control based on the ordinary skyhook damper theory, the direction of the required application force F* changes based on mainly the sprung speed v, namely, the direction of the required application force F* changes on a boundary line on which v=0 and which passes the origin O and extends in the vertical direction. More specifically, the required application force F* is a downward force in the first and fourth quadrants while the required application force F* is an upward force in the second and third quadrants. Here, like the sprung speed v and the sprung acceleration α, a positive value of the required application force F* represents the upward force while a negative value of the required application force F* represents the downward force.

In contrast, the boundary line L indicated above passes the origin O of the coordinate system and extends across the second quadrant and the fourth quadrant. In the absorber system 20, therefore, the direction of the required application force F* changes on the boundary line L. More specifically, the required application force F* is a downward force in a region including the first quadrant while the required application force F* is an upward force in a region including the third quadrant. That is, in the absorber system 20, the required application force F* is determined according to such a determination rule. For instance, in a case of a simple harmonic vibration of the sprung portion, the sprung speed v and the sprung acceleration α change clockwise as indicated by the hollow allows in FIG. 4. In view of this, the required application force F* is determined in the absorber system 20 according to a determination rule in which the direction of the force changes before the direction of the sprung speed v changes.

The required application force F* determined according to the determination rule described above has the same direction as the direction of the sprung speed v in a region of the second quadrant that is located in one of opposite sides of the boundary line L nearer to the first quadrant and in a region of the fourth quadrant that is located on one of opposite sides of the boundary line L nearer to the third quadrant, namely, in the hatched regions in the graph of FIG. 4. In other words, the required application force F* determined according to the determination rule described above has the same direction as the direction of the sprung speed v when the sprung speed v is relatively small (i.e., the absolute value of the sprung speed v is small) and the sprung acceleration α is relatively large (i.e., the absolute value of the sprung acceleration α is large) in a situation in which the direction of the sprung speed v and the direction of the sprung acceleration α are mutually different. In this sense, each of the hatched regions may be referred to as an "identical region" in which the direction of the sprung speed and the direction of the required application force are identical to each other.

The boundary line L indicated above is set as a curved line which is convex toward the first quadrant in the second quadrant and which is convex toward the third quadrant in the fourth quadrant, for effectively damping the vibration of the sprung portion. Further, the boundary line L may be regarded as a function indicative of a virtual sprung speed $v_{SIM}$ that is virtually estimated based on the sprung acceleration α, and is represented by the following expression (1) in which "A" and "B" are coefficients:

$$v_{SIM} = \frac{1}{B}\left(e^{-\frac{\alpha}{A}} - 1\right) \; \alpha \leq 0 \quad \text{Expression (1)}$$

$$v_{SIM} = -\frac{1}{B}\left(e^{\frac{\alpha}{A}} - 1\right) \; \alpha > 0$$

According to the determination rule described above, the required application force F* is determined based on a sprung-speed deviation $\sigma_v$ that is a deviation of the actual sprung speed v from the virtual sprung speed $v_{SIM}$, and the sprung-speed deviation $\sigma_v$ is represented by the following expression (2):

$$\sigma_v = \frac{1}{B}\left(e^{-\frac{\alpha}{A}} - 1\right) - v \; \alpha \leq 0 \quad \text{Expression (2)}$$

$$\sigma_v = -\frac{1}{B}\left(e^{\frac{\alpha}{A}} - 1\right) - v \; \alpha > 0$$

According to the determination rule described above, the required application force F* is the upward force when the sprung-speed deviation $\sigma_v$ is a positive value while the required application force F* is the downward force when the sprung-speed deviation $\sigma_v$ is a negative value. That is, the direction in which the required application force F* acts changes depending upon whether the sprung-speed deviation $\sigma_v$ is positive or negative. Specifically, the required application force F* is determined in the absorber system 20 on the basis of the sprung-speed deviation $\sigma_v$ according to a function represented by the following expression (3) in which "K" is a coefficient:

$$F^* = -f_{SAT}(K\sigma_v) \quad \text{Expression (3)}$$

Figure 5:
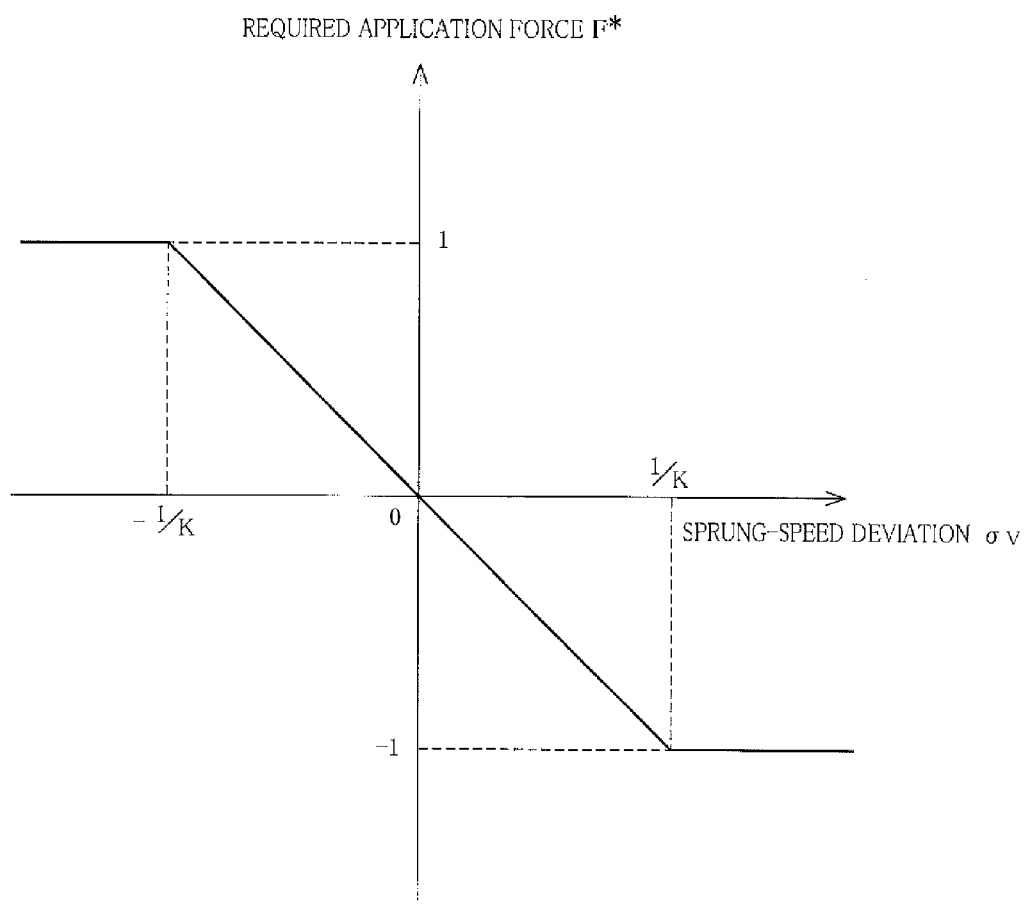
FIG. 5 is a graph showing a relationship between the determined required application force and a sprung-speed deviation.

The above-indicated function $f_{SAT}()$ is a function that is saturated at ±1, and the required application force F* determined according to the above expression is represented in the graph of FIG. 5. That is, the required application force F* is determined such that its absolute value becomes large with an increase in the sprung-speed deviation $\sigma_v$, namely, with an increase in its absolute value in a strict sense, in a range in which the function is not saturated.

Figure 6A:
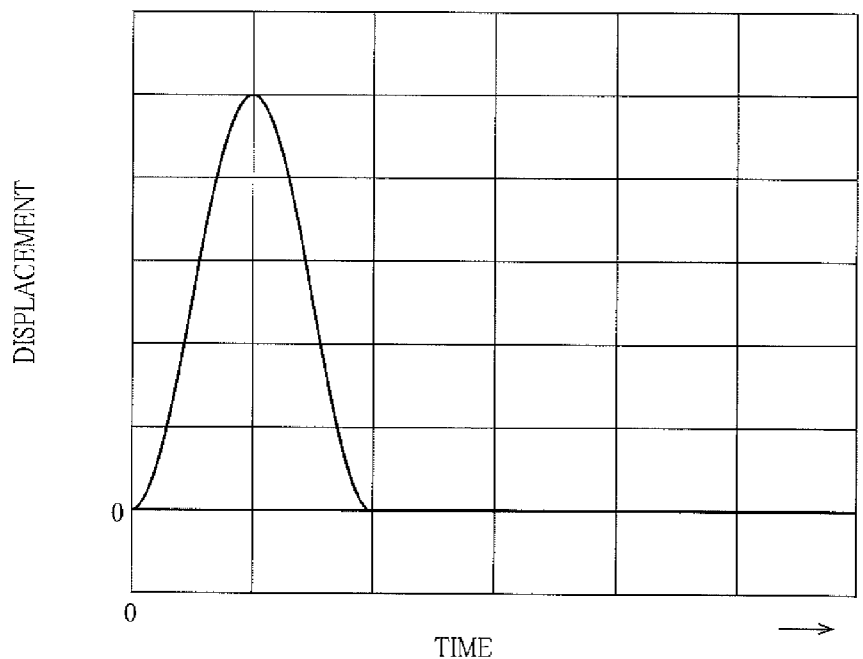
FIGS. 6A and 6B are graphs each for explaining the required application force determined in the shock absorber system according to the embodiment.
Figure 6B:
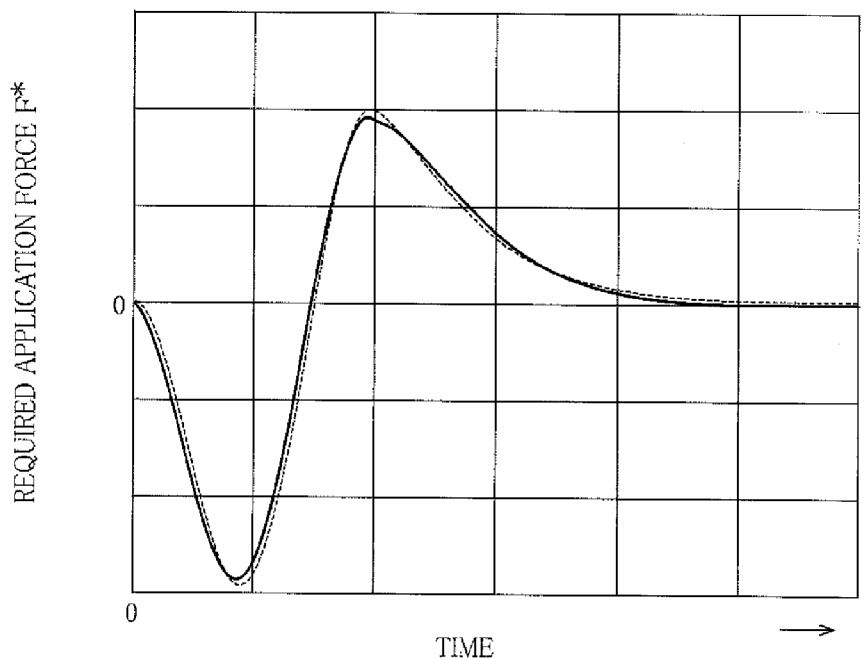
Figure 7A:
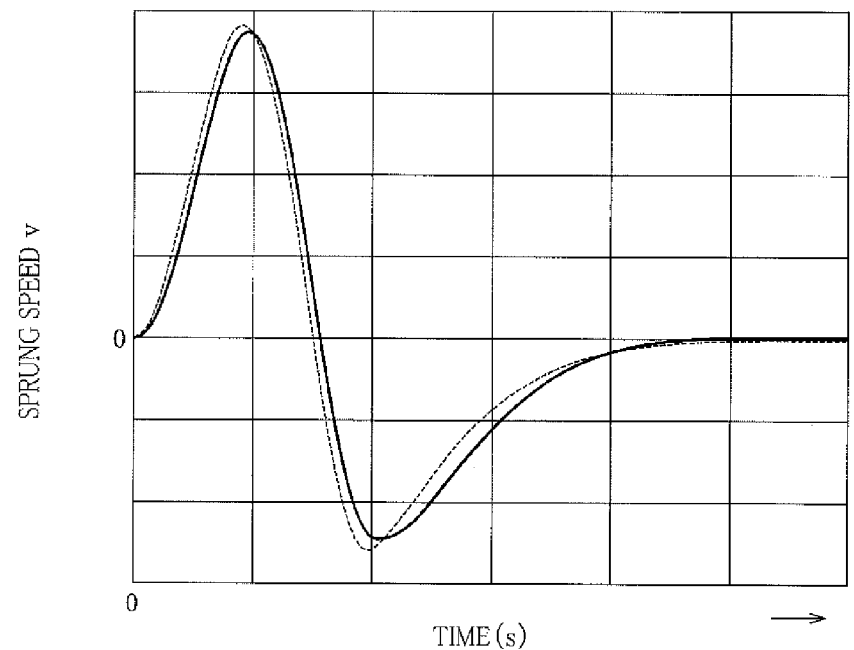
FIGS. 7A and 7B are graphs each showing a damping state of a vibration of a sprung portion in the shock absorber system according to the embodiment.
Figure 7B:
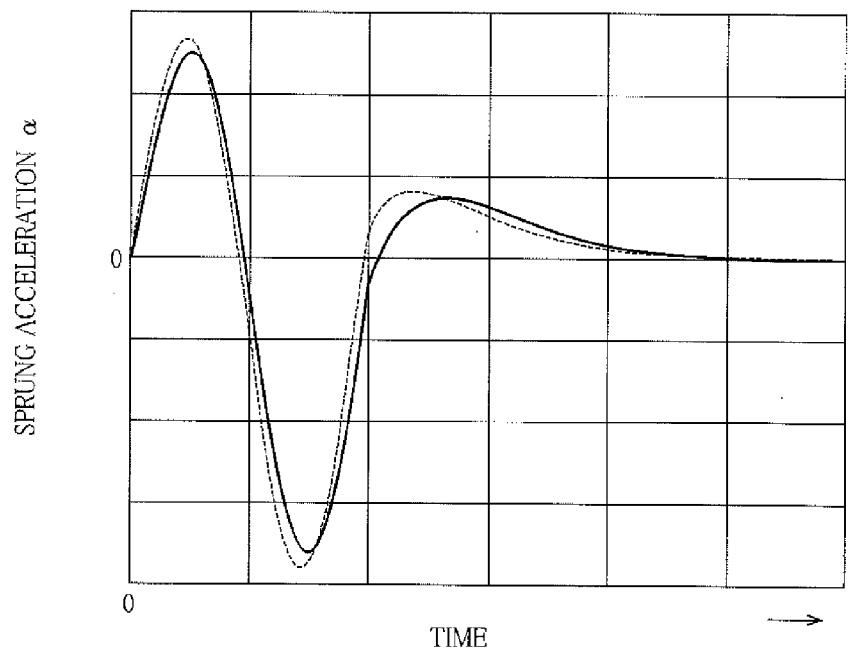

The graph of FIG. 6B shows the required application force F* determined according to the determination rule. The graphs of FIGS. 7A and 7B show, as simulation results, a manner of damping of the movement of the sprung portion when the required application force F* is applied to the sprung portion. The dotted line in each of the graphs of FIGS. 6B, 7A, and 7B shows a t when the required application force F* is determined based on the ordinary skyhook damper theory. When the unsprung portion is displaced as indicated in the graph of FIG. 6A following ups and downs (irregularities) of a road surface, the required application force F* as indicated in the graph of FIG. 6B acts on the sprung portion. As result, the sprung speed v changes as indicated in the graph of FIG. 7A by the action of the required application force F*, and the sprung acceleration α changes as indicated in the graph of FIG. 7B.

As apparent from the graph of FIG. 6B, when the required application force F* is determined according to the determination rule described above, the maximum value of the required application force F* is small, and the vibration of the sprung portion is damped efficiently. As apparent from the graphs of FIGS. 7A and 7B, peaks of the sprung speed v and the sprung acceleration α are reduced, and gradients according to which the sprung speed v and the sprung acceleration α change also become small. Consequently, the vibration of the sprung portion can be damped more effectively when the required application force F* is determined according to the determination rule described above than when the required application force F* is determined based on the ordinary skyhook damper theory.

(b) Control of Damping Force Based on Required Application Force

In the absorber system 20, the damping force generated by the absorber 22 is controlled based on the required application force F* determined as described above. As shown in FIG. 3, when F*=0, the supply current I corresponding to the normal current $I_0$ is supplied to the damping-force changer 24. When F*<0 in the rebound movement, a larger supply current I is supplied to the damping-force changer 24 with an increase in the absolute value |F*|. When F*>0 in the bound movement, a larger supply current I is supplied to the damping-force changer 24 with an increase in the absolute value |F*|. In short, the control is executed in the absorber system 20 such that, with an increase in the required application force F*, the supply current I to be supplied to the damping-force changer 24 becomes larger and the magnitude of the damping force F to be generated by the absorber 22 becomes larger. When F*=−1 in the rebound movement and when F*=1 in the bound movement, the supply current I corresponding to the maximum current $I_{MAX}$ is supplied to the damping-force changer 24 and the damping force F generated by the absorber 22 becomes maximum.

The absorber 22 is configured to generate the damping force with respect to the relative movement of the sprung portion and the unsprung portion. Therefore, when F*>0 in the rebound movement and when F*<0 in the bound movement, the required application force F* cannot be applied to the sprung portion. In these instances, the absorber 22 can only apply, to the sprung portion, a force whose direction is opposite to the direction of the required application force F*. In these instances, there is executed a control in which the supply current I corresponding to the minimum current $I_{MIN}$ is supplied to the damping-force changer 24 and the damping force F to be generated by the absorber 22 is minimized.

(c) Process of Control

The control of the damping force generated by the absorber 22 is executed such that the controller 26 constituted mainly by a computer executes a damping-force control program shown in FIG. 8 at a short time pitch from several msec. to several tens of msec., for instance. There are connected, to the controller 26, a sprung acceleration sensor 122 for detecting the sprung acceleration α and a stroke sensor 124 for detecting a stroke position ST that is a distance between the sprung portion and the unsprung portion.

In processing according to the damping-force control program, the stroke position ST and the sprung acceleration α are initially detected at Step 1 (hereinafter abbreviated as "S1" and other steps will be similarly abbreviated) based on values detected by the stroke sensor 124 and the sprung acceleration sensor 122. There are subsequently estimated at S2 the stroke speed $v_{ST}$ and the sprung speed v based on: the currently detected stroke position ST and sprung acceleration α; and the previously detected stroke position ST and sprung acceleration α. Then, at S3, the virtual sprung speed $v_{SIM}$ is estimated based on the sprung acceleration α according to the above expression, and the sprung-speed deviation $σ_v$ is estimated based on the estimated virtual sprung speed $v_{SIM}$ and the estimated sprung speed v according to the above expression. Based on the estimated sprung-speed deviation $σ_v$, the required application force F* is determined at S4 according to the above function. Thereafter, it is determined, at S5, based on the estimated stroke speed $v_{ST}$ whether the relative movement of the sprung portion and the unsprung portion is the bound movement or the rebound movement, namely, determination of the bound movement or the rebound movement is made.

After the determination of the required application force F* and the determination of the bound movement or the rebound movement have been made, the supply current I to be supplied to the damping-force changer 24 is determined at S6 based on the determined required application force F* and the result of the determination of the bound movement or the rebound movement. Subsequently, at S7, the determined supply current I is supplied to the damping-force changer 24. One execution of the damping-force control program ends by execution of a series of processing described above.

What is claimed is:

1. A shock absorber system, comprising:
a hydraulic shock absorber disposed between a sprung portion and an unsprung portion of a vehicle, the hydraulic shock absorber being configured to extend and contract in accordance with a relative movement of the sprung portion and the unsprung portion in an up-down direction and to generate a damping force with respect to the relative movement;
a damping-force changer configured to give a resistance to a flow of a working fluid caused in the hydraulic shock absorber by the relative movement of the sprung portion and the unsprung portion and to change a magnitude of the resistance, so as to change the damping force to be generated by the hydraulic shock absorber; and
a controller configured to determine a damping-force index that is an index for changing the damping force and to control the damping-force changer based on the determined damping-force index, so as to control the damping force to be generated by the hydraulic shock absorber,
wherein the controller is configured to determine, as the damping-force index, a required application force that is a force to be applied to the sprung portion for damping a movement of the sprung portion in the up-down direction, according to a determination rule in which the required application force has the same direction as a direction of a sprung speed that is a speed of the sprung portion in the up-down direction when the sprung speed is relatively small and sprung acceleration that is acceleration of the sprung portion in the up-down direction is relatively large in a situation in which the direction of the sprung speed and a direction of the sprung acceleration are mutually different, and
wherein in a coordinate system whose transverse axis represents the sprung speed and vertical axis represents the sprung acceleration, where there is set a boundary line which passes an origin at which both of the sprung speed and the sprung acceleration are 0 and which extends across a second quadrant and a fourth quadrant, the determination rule is visually defined as: in the determination rule the required application force has the same direction as the direction of the sprung speed when the sprung speed and the sprung acceleration belong to a region in the second quadrant that is located on one of opposite sides of the boundary line nearer to a first quadrant or a region in the fourth quadrant that is located on one of opposite sides of the boundary line nearer to a third quadrant.

2. The shock absorber system according to claim 1, wherein the controller is configured to control the damping force to be generated by the hydraulic shock absorber such that the damping force increases with an increase in the required application force.

3. The shock absorber system according to claim 1, wherein the controller is configured to determine the required application force according to the determination rule in which the boundary line is set as a curved line which is convex toward the first quadrant in the second quadrant and which is convex toward the third quadrant in the fourth quadrant.

4. The shock absorber system according to claim 1, wherein the controller is configured to determine the required application force according to the determination rule in which the boundary line is set as a function indicative of a virtual sprung speed that is virtually estimated based on the sprung acceleration.

5. The shock absorber system according to claim 1, wherein the controller is configured to determine the required application force according to the determination rule in which a direction in which the required application force acts changes depending upon whether a deviation of the sprung speed from a virtual sprung speed that is virtually estimated based on the sprung acceleration is positive or negative.

6. The shock absorber system according to claim 5, wherein the controller is configured to determine the required application force according to the determination rule in which the required application force increases with an increase in the deviation.

* * * * *